United States Patent [19]
Widmaier

[11] 4,000,363
[45] Dec. 28, 1976

[54] ARRANGEMENT FOR THE PRODUCTION OF SELECTION PULSES IN TELEPRINTERS

[75] Inventor: Hans-Dietrich Widmaier, Munich, Germany

[73] Assignee: Siemens Aktiengesellschaft, Berlin & Munich, Germany

[22] Filed: Oct. 18, 1974

[21] Appl. No.: 515,876

[30] Foreign Application Priority Data

Oct. 29, 1973 Germany ............................ 2354057

[52] U.S. Cl. .............................. 178/2 R; 178/26 R; 179/90 K
[51] Int. Cl.² ................... H04L 11/00; H04M 1/30
[58] Field of Search ............... 178/4.1 R, 2 B, 2 R, 178/3, 26, 26 A; 340/168 R, 168 B; 179/90 K

[56] References Cited
UNITED STATES PATENTS

| | | | |
|---|---|---|---|
| 3,046,526 | 7/1962 | Scantlin | 178/4.1 R |
| 3,436,477 | 4/1969 | Ghiringhelli | 178/3 |
| 3,585,596 | 6/1971 | Rosenblatt | 340/168 R |
| 3,787,639 | 1/1974 | Battrick | 179/90 K |

*Primary Examiner*—Thomas A. Robinson
*Attorney, Agent, or Firm*—Hill, Gross, Simpson, Van Santen, Steadman, Chiara & Simpson

[57] ABSTRACT

A teleprinting apparatus which eliminates a dial switch for connection to a remote subscriber and which substitutes a circuit arrangement which utilizes the keyboard through a coding system to generate pulse trains for connection to the remote subscriber. A selection pulse generator is set in operation by a "proceed to select" signal which is supplied with signals emitted by a keyboard and derived from a counter pulse train of constant repetition frequency. In this way selection pulses are produced, the number of which is determined by the key which is being operated. The number is actually fixed by the use of a comparator which compares the keyboard signal with the output of a counter which is counting the pulse train.

7 Claims, 3 Drawing Figures

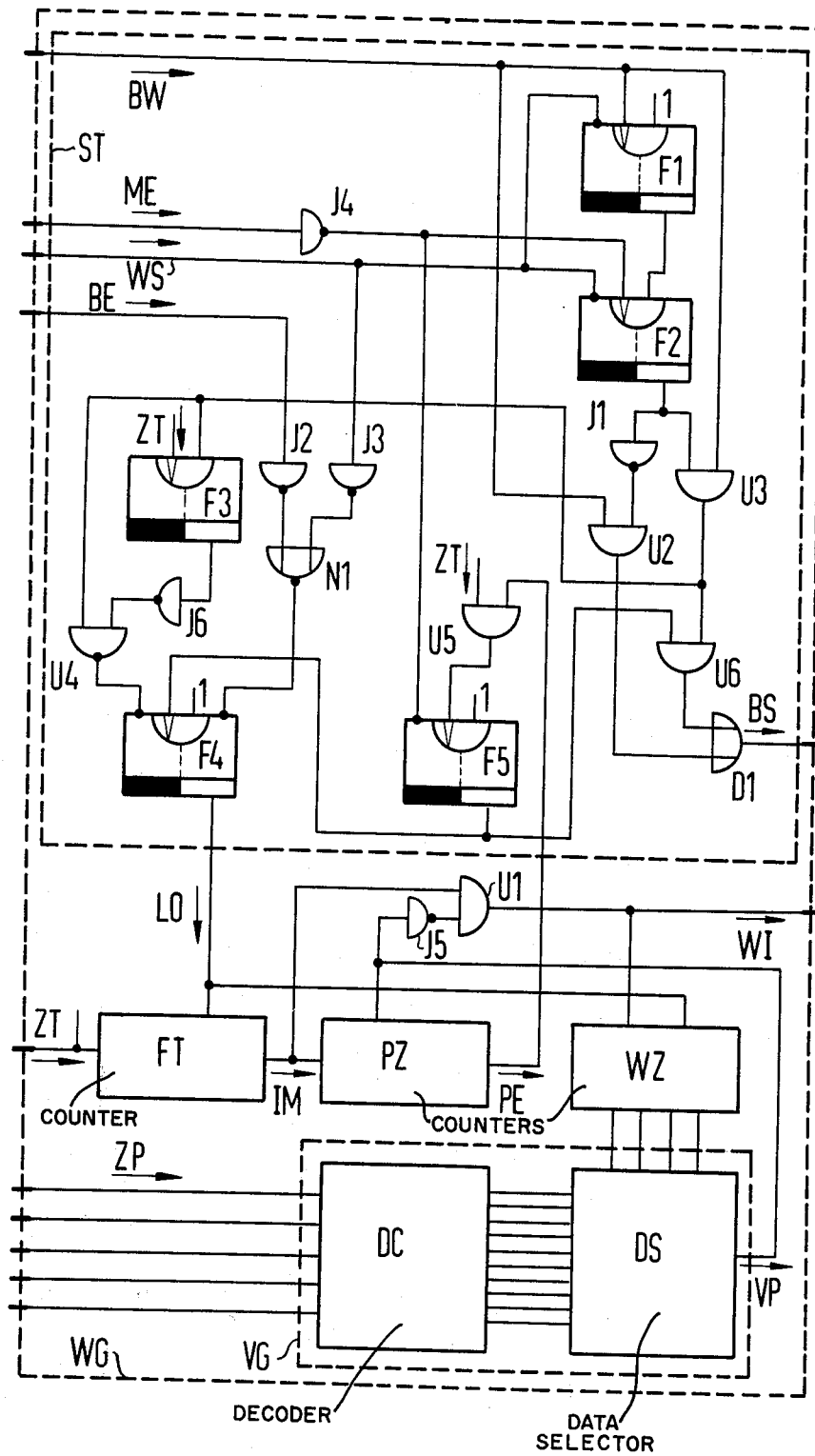

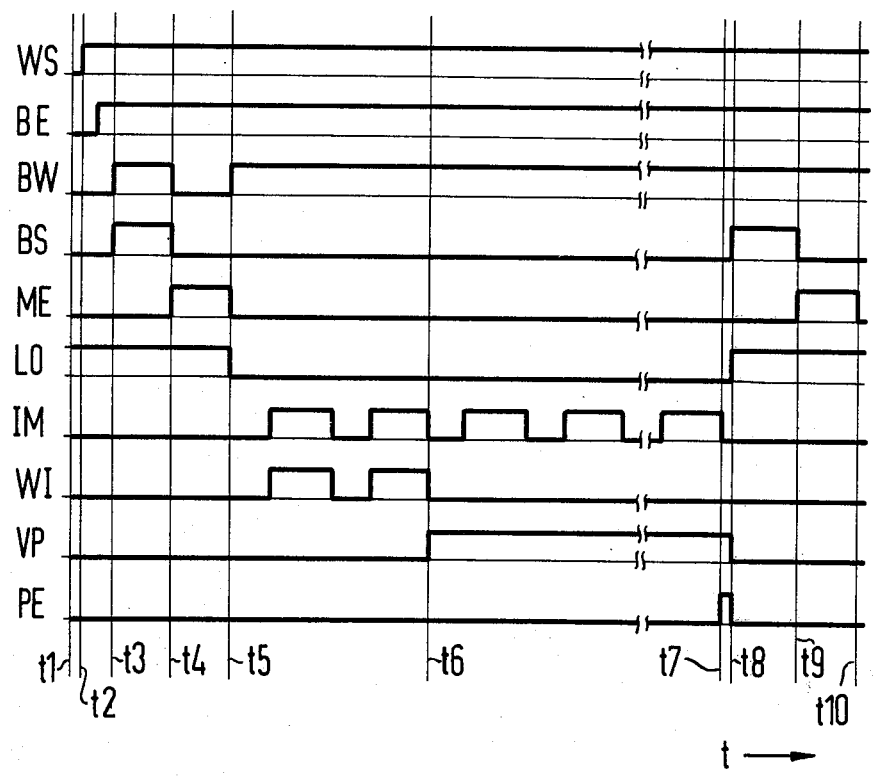

ARRANGEMENT FOR THE PRODUCTION OF SELECTION PULSES IN TELEPRINTERS

BACKGROUND OF THE INVENTION

Usually the housing of a teleprinter is provided with a dial switch similar to the rotary dial of a telephone apparatus. The dial switch produces the selection pulses by rhythmically opening and closing a contact. The selection pulses are then conducted by way of a switching device and a teleprinter line to an exchange system. A dial switch of this type, however, has the disadvantage that it contains mechanically moving components which are subject to wear and which thereby may cause errors in the selection pulses being emitted.

FIELD OF THE INVENTION

The field of art to which this invention pertains is teleprinting devices and in particular to means for producing selection pulses for connection from one teleprinter to a remote subscriber.

SUMMARY OF THE INVENTION

It is an important feature of the present invention to provide an improved teleprinting connection apparatus.

It is a principal object of the present invention to provide a means for utilizing the keyboard of a teleprinting device as a means for developing selection pulses to couple to a remote subscriber.

It is another feature of the present invention to provide a teleprinting apparatus having a keyboard function as described above, having a selection pulse generator which is supplied with signals from a counter pulse train of constant repetition frequency, the number being determined by the selection of the key on the keyboard.

It is also a feature of the present invention to provide a teleprinting device as described above wherein a blocking circuit is provided to pass pulses in a train having a number which corresponds to the key being depressed only and for blocking further passing of pulses; and wherein an output signal from a comparator is used to trigger the operation of the blocking circuit in response to the operation of a key on the keyboard.

It is another object of the present invention to provide a teleprinting arrangement as described above which utilizes a selection pulse generator and an interval counter to produce a desired interval between two sequences of selection pulses.

These and other objects, features and advantages of the present invention will be understood in greater detail from the following description and the associated drawings wherein reference numerals are utilized to designate a preferred embodiment.

BRIEF DESCRIPTION OF THE DRAWINGS

FIG. 2 shows a block diagram of a selection pulse generator indicating many individual circuit features.

FIG. 3 shows pulse diagrams of signals at various points in the selection pulse diagram of FIG. 2.

DESCRIPTION OF THE PREFERRED EMBODIMENT

Figure 1:
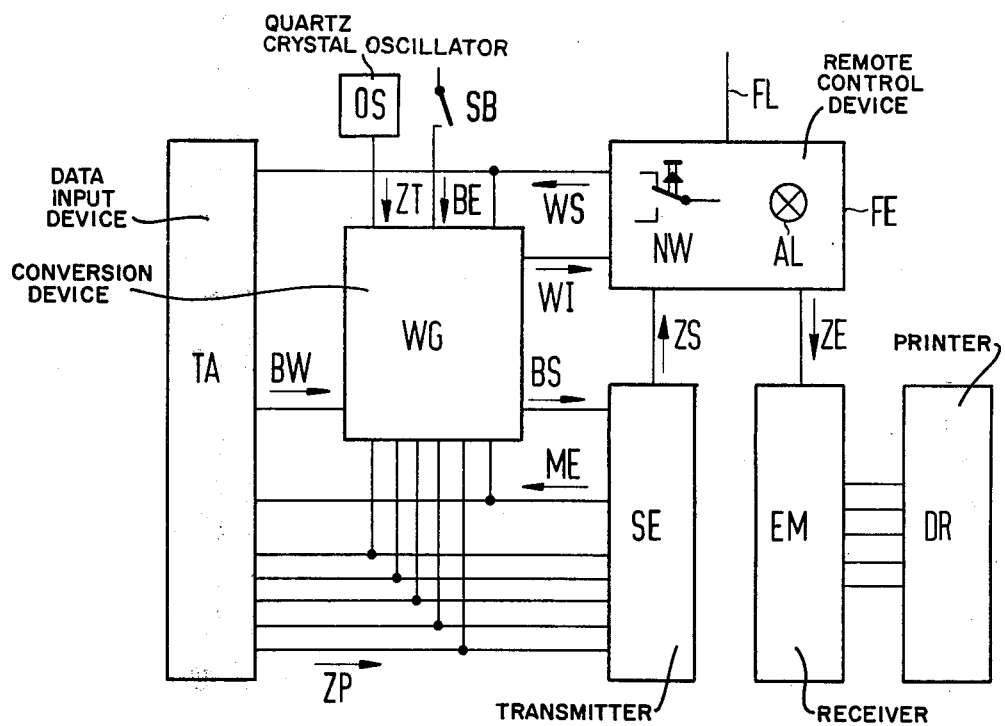
FIG. 1 is a block diagram of a teleprinting apparatus equipped with a selection pulse generator for keyboard pulse selection according to the present invention.

The present invention relates to a device in a teleprinter for producing selection pulses by the use of the keyboard, rather than by the use of a rotary dial switch. This is accomplished by the use of a selection pulse generator which is set into operation by a "proceed to select" signal which is supplied with the signals emitted by the keyboard. A counter pulse train of constant repetition frequency produces selection pulses, the number of which is determined by the signal emitted by a given key being depressed.

The selection pulse generator of the present invention has a control circuit which serves to control the sequence in which the selection pulses are produced. The circuit also has a counter which produces pulses from the counter pulse train and emits these as selection pulses by way of a blocking circuit at the output of the selection pulse generator. A selection pulse counter counts the emitted selection pulses and a comparator compares the number of selection pulses with the number determined by the signal developed at the keyboard. When the two numbers coincide, the comparator prevents the blocking circuit from passing further selection pulses.

The selection pulse circuit also includes an interval counter which, after the emission of selection pulses, counts a prescribed interval between two sequences of selection pulses.

The comparator contains a data selector and a decoder which converts the digits assigned to the signals at the keyboard into a $l$-from-$n$ code. The address input of the data selector is connected to the output of the selection pulse counter and the data inputs of the data selector are connected to the outputs of the decoder.

When the correct number of selection pulses has been passed, the passing of further pulses is prevented by an AND gate which has at one input the pulses and then at a second input a signal produced by the comparator.

In order to release the counter and the selection pulse counter only during the emission of a sequence of selection pulses and the associated interval, it is desirable for the control circuit to contain a flip-flop circuit whose output is connected to the resetting terminals of the counter and of the selection pulse counter and which emits an erasing signal at the end of each interval.

A verification of the selection can be accomplished by the use of a print-out. This means using the ordinary teleprinter as a printing verifier of the selection signals. The present invention also provides a re-selection key which emits the selection signal and causes the selection pulse generator to emit a further sequence of selection pulses after the establishment of a connection to a remote subscriber.

The block diagram of a teleprinter according to the present invention, as illustrated in FIG. 1, shows a remote control switching device FE which is used to establish a connection to a remote subscriber by way of a teleprinter line FL and an exchange system which is not illustrated.

On the operation of a call key, a call light AL lights on the teleprinter machine. The operator then selects the number of the remote subscriber. A selection pulse generator WG produces selection pulses WI which are emitted by way of the remote control switching unit FE to the teleprinter line FL.

After the connection to the remote subscriber is established, the exchange (not shown) reverses the polarity of the teleprinter line FL and the call light is extinguished and a clearance light is turned on. At this point the operator can commence transmitting items of data.

A keyboard is illustrated at TA and emits signals ZP, which represent parallel-coded signals to a transmitter SE of the teleprinter. The transmitter SE converts the parallel-coded signals into serial-coded signals and emits them as signals ZS to the remote control switching unit FE. The remote control switching unit FE transmits the signals ZS by way of the teleprinter line FL to the remote subscriber. For verification, the signals ZS are also conducted to a receiver EM which converts the serial-coded signals back into parallel-coded signals for conduction to a printer DR which prints out the selection information to provide verification.

A switch SB is closed when the teleprinter is ready for operation. This couples a signal BE to the selection pulse generator WG. A quartz oscillator feeds a counter pulse train ZT of constant repetition frequency to the selection pulse generator WG.

The remote control switching unit FE emits a selection signal WS to the keyboard TA and into the selection pulse generator WG. This is used to establish the period of time during which selection can be carried out between the lighting of the call light AL and the lighting of the clearance light for data transmission. The selection signal WS insures, for example, in the case of digit selection on the keyboard TA, that analysis is carried out only for the digit keys 0 through 9. The selection signal WS also prepares the selection pulse generator WG to emit selection pulses WI.

When one of the digit keys is operated, the keyboard TA generates a command BW to the selection pulse generator WG. At the same time a parallel-coded signal assigned to the given key being operated is generated in the form of a signal ZP at the output of the keyboard TA. The signal ZP is passed to both the transmitter SE and to the selection pulse generator WG. In this way with the aid of the counter, a pulse train corresponding in number to the selected signal ZP is produced. This is true except for the digit 0. When the digit 0 is operated, ten selection pulses are emitted.

Immediately after the command BW the selection pulse generator WG feeds a command BS to the transmitter SE. With this command the transmitter receives the signal ZP, produces the signal ZS and transmits the latter to the remote controlled switching unit FE. As this signal ZS does not represent a character of an item of data for the remote subscriber, the remote controlled switching unit FE prevents the signal ZS from being switched through to the teleprinter line FL.

If a verification print-out of the dial digit is required, the teleprinter unit FE switches through the signal ZS to the receiver EM. The receiver EM reconverts the signal into a parallel-coded signal and conducts it to the printer. The latter prints out the character and thus provides a verification print-out of the selected digit. If no such verification print-out is required in the remote controlled switching unit FE, the signal ZS can be prevented from being switched through from the transmitter SE to the receiver EM.

When the signal ZP has been transferred into the transmitter SE, the latter feeds a message ME to the keyboard TA and to the selection pulse generator WG. This message ME informs the keyboard TA that the signal ZP has been transferred and is no longer required. Then the keyboard TA removes the command BW. The command BS is also removed and the transmitter SE then likewise removes the message ME. Subsequently, after the operation of the next digit key the keyboard TA emits a new command BW and a new signal ZP representing the next selected digit. The emission of the associated sequence of selection pulses WI is not commenced until a prescribed interval has expired.

When a connection has been established, after the operation of a key NW on the teleprinter, a process of reselection can commence, if an extension is to be selected in the remote subscriber station. The key NW produces a signal which is also emitted as selection signal WS and causes the selection pulse generator WG in this way to again emit selection pulses WI.

The circuit diagram, illustrated in FIG. 2, of the selection pulse generator WG shows a counter FT which, from the counter pulse train ZT, produces pulses IM whose keying ratio is equal to the required keying ratio for the selection pulses WI. For example, the keying ratio is selected to be such that the pulses IM each have a duration of 60 ms and an interval of 40 ms exists between two successive pulses IM. The repetition frequency of the pulses IM in this case is 10 Hz.

The pulses IM are conducted to a first input of an AND gate U1 which transmits to the remote controlled switching unit FE as selection pulses WI only as many pulses as indicated by the operation of the relevant digit key.

FIG. 2 shows a comparator VG composed of a data selector DS and a decoder DC and also a selection pulse counter WZ which counts the selection pulses WI which are coupled to the remote controlled switching unit FE. The output of the selection pulse counter WZ is connected to the address inputs of the data selector DS. The data inputs of the data selector DS are supplied with binary coded signals which are produced from the signals ZP by means of the decoder DC. The signals ZP which represent digits coded by a conventional teleprinter code are converted by the decoder DC into a 1-from-10 code. If the binary-coded address at the address input of the data selector DS agrees with a data input at which a signal is applied, this signal is coupled to the output of the data selector DS where it is emitted as the signal VP. Such a data selector DS is generally known, i.e., under the mark SN 74 150 N by Texas Instruments Inc. The signal VP indicates that the number of selection pulses WI determined by the selection pulse counter WZ is identical to the digit represented by the signal ZP. The signal VP is connected to a second input of the AND-gate U1 and thus prevents further selection pulses WI from being fed to the remote controlled switching unit FE.

Simultaneously with the blockage of the AND gate U1 the signal VP releases an interval counter PZ. The interval counter PZ serves to produce the interval required for the selection process between two sequences of selection pulses WI. If, for example, an interval of at least 600 ms is required, with the above mentioned pulse repetition frequency of 10 Hz the interval counter PZ counts for example 6 pulses IM. After the pulses IM have been counted, the interval counter PZ emits a signal PE at its output to the control circuit ST. The signal PE causes the emission of an erasure signal LO which resets the counter FT in such manner that the binary value 0 is emitted at its output. Also it sets the selection pulse counter WZ to an initial value for example the binary value 0. Immediately after the signal LO is emitted the signal VP is removed. The interval counter PZ is thus likewise reset, and the AND gate U1 is prepared for the next sequence of selection pulses WI. Known modulo-2-counters can be used as interval counter PZ and selection pulse counter WZ. The counter FT consists of a series connection of modulo-2-, modulo-5 and modulo-12 counters.

The control circuit ST converts the commands BW from the keyboard TA into the commands BS for the transmitter SE and controls the time sequence of the production of the selection pulses WI.

Further details of the selection pulse generator WG represented in FIG. 2 will be described in association with the time diagrams illustrated in FIG. 3.

In the time diagrams represented in FIG. 3 time t is plotted in the abscissa direction and the amplitudes of the signals are plotted in the ordinate direction. As all the signals are binary signals they can only assume binary values referenced 1 and 0.

At the time $t1$, it is assumed that the remote controlled switching unit FE has not yet emitted the selection signal WS and therefore assumes the binary value 0. The flip-flops, F1 and F2, of the control circuit ST are thus held in their reset state. The signal at the output of the flip-flop F2 releases an AND gate U2 via an inverter I1.

It is assumed that the signal BE which is produced by the teleprinter control switch SB and which indicates that the teleprinter is ready for operation, is not yet present. Via inverters I2 and I3 and a NOR gate N1, a further flip-flop F4, which produces the erasure signal L), is held in the set state. The erasure signal L) holds the counter FT and the selection pulse counter WZ at the relevant starting values. The signal VP at the output of the comparator VG has the binary value 0 and thus holds the interval counter PZ in its rest position.

At the time $t2$ it is assumed that the selection signal WS arrives from the remote controlled switching unit FE and the number of the remote subscriber can now be selected. Shortly thereafter the signal BE is assumed to arrive from the teleprinter control unit FS. The flip-flop F4 is thus no longer held in its set state.

After the operation of the first digit key, at the time $t3$, the keyboard TA feeds to the selection pulse generator WG, a command BW, which is coupled via an AND gate U2 and an OR gate D1 as command BS to the transmitter SE.

As the selection signal WS ensures that only the digit keys on the keyboard can be analyzed, firstly at the output of the keyboard TA there is emitted a signal ZP which represents the signal for a changeover of digits. If a verification print-out of the number of the remote subscriber is required, this signal couples to the transmitter SE, and the receiver EM to the printer DR and prepares the printer DR to print-out digits.

Following the transfer of the signal ZP into the transmitter SE, at the time t4, the latter emits the message ME to the control circuit ST and to the keyboard TA. In the keyboard TA the message eliminates the command BS and in the control circuit ST it sets the flip-flop F2 via an inverter I4. The signal at the output of the flip-flop F2 blocks the AND-gate U2 and thus also eliminates the command BS.

The elimination of the command BS results, in the transmitter SE, in the elimination of the message ME at the time t5. After the elimination of the message ME, the keyboard TA emits a new command BW to the control circuit ST and connects a signal ZP to its output which signal represents the digit of the operated digit key. This command BW produces, via an AND gate U3 and a NAND gate U4, a resetting of the flip-flop F4 and, with the next counter pulse train ZT causes a setting of the flip-flop F3. Via an inverter I6 and the NAND gate U4, the resetting input of the flip-flop F4 is released again.

With the resetting of the flip-flop F4, the counter FT and the selection pulse counter WZ are released. In the manner described above the counter FT produces, from the counter pulse train ZT, the pulses IM whose keying ratio and whose repetition frequency correspond to those of the selection pulses WI. The pulses IM are fed via the AND gate U1 as selection pulses WI from the output of the selection pulse generator WG and transmitted to the remote controlled switching unit FE. They are also counted in the selection pulse counter WZ.

It will be assumed that the digit key for the digit 2 has been operated and therefore at the output of the keyboard TA there is emitted a signal ZP which is assigned to the digit 2. This signal ZP is conducted to the transmitter SE in order to be available for verification print-out. It is also offered to the decoder DC by which it is decoded in the manner described above for comparison with the number of emitted selection pulses WI.

Until the time t6, two selection pulses WI have been emitted from the selection pulse generator WG to the remote controlled switching unit FE and counted by the selection pulse generator WZ. The count of the selection pulse counter WZ consequently agrees with the digit of the operated digit key and the data selector DS emits the signal VP. Via an inverter I5 the signal VP prevents further selection pulses WI from being emitted from the AND gate U1. At the same time the signal VP releases the interval counter PZ.

The interval counter PZ counts the pulses IM which are emitted after the selection pulses WI from the counter FT. As stated above, in the represented exemplary embodiment it counts up to the count of 6 in order to produce an interval of at least 600 ms. After six pulses IM, the interval counter PZ emits, at the time t7, a signal PE which characterizes the end of the interval. The signal PE is linked with the counter pulse train ZT in an AND gate U5 and sets the flip-flop F5 at the time t8.

The setting of the flip-flop F5 causes the command BW to be passed on by the AND gate U6 to the OR gate D1 which feeds a command BS to the transmitter SE. With this command the signal ZP is transferred to the transmitter SE and, if a verification print-out is required, is also transmitted by way of the receiver EM to the printer DR. At the same time, the flip-flop F4 is set, whose output signal LO causes the resetting and the holding of the counter FT and of the selection pulse counter WZ. As a result of the resetting of the selection pulse counter WZ, the data selector DS cannot detect identity between the count of the selection pulse counter WZ and the digit ZP indicated by the keyboard TA and therefore the signal VP assumes the binary value 0 and returns the interval counter PZ to its rest state.

At the time $t9$, the transmitter SE has received the signal ZP and feeds the message ME to the control circuit ST and to the keyboard TA. This message results, via the inverter 14 in the resetting of the flip-flop F5 as a consequence of which the AND gate U6 is blocked and eliminates the command BS. The elimination of the command BS results in the elimination of the message ME at the time t10 in the transmitter SE.

The selection pulse generator WG is again ready to receive a command BW from the keyboard TA and to emit a new sequence of selection pulses WI. When the next digit is selected, the same signalling sequence occurs as between the times t5 and t10. After the selection of the number of the remote subscriber, the remote controlled switching unit FE re-eliminates the selection signal WS and the first item of data can now be transmitted.

If the keyboard is provided with a memory into which a plurality of characters can be keyed, then in each case following the transmission of a sequence of selection pulses WI, a command BW is automatically fed from the keyboard TA to the selection pulse generator WG and an associated signal ZP is fed to the transmitter SE and to the decoder DC. Such a memory is usually linked to blocking facilities for the keys of the keyboard TA to ensure that characters cannot be keyed into a memory which is already full. The digits can be very rapidly keyed into such a memory until the blocking facilities respond.

If a keyboard without blocking facilities is employed, an overflow warning can serve as a protection against too rapid input of digits during selection.

If a re-selection process is required to reach extensions after the establishment of a connection with a remote subscriber, the teleprinter must be provided with an additional key NW which is operated in the case of a reselection. The continuous signal emitted from the key NW is linked with the selection signal WS, for example, in an OR gate and thus ensures that selection pulses WI are produced from the characters which are keyed in following the operation of the keys NW.

What I claim is:

1. In a teleprinting apparatus, a circuit arrangement for the transmission of dialing signals in response to keyboard operation comprising:
   a data input device,
   an output circuit being coupled to a data switching center,
   a transmission device coupled to the data input device,
   a conversion device in parallel with the transmission device for converting data signals into dialing signals,
   a remote control device coupled to the conversion device and to the transmission device for switching the output circuit to the conversion device during a dialing operation and at other times to said transmission device,
   a receiver, a printer and means coupling the output of the transmission device to the receiver and printer,
   means for producing a pulse train of constant frequency,
   means for producing a "proceed to select" signal, for initiating said pulse train,
   signal means generated by operation of the keyboard for determining the number of pulses from said pulse train to be used as selection pulses,
   the exact number of said pulses being determined to correspond to the number of the key being operated,
   a control circuit to control the sequence of the production of selection pulses,
   a counter for counting pulses from said pulse train,
   a blocking circuit having an input coupled to an output of said counter,
   a selection pulse counter coupled to said first mentioned counter for counting pulses therefrom,
   a comparator for comparing the number of pulses counted by the selection pulse counter with the desired number as determined by a signal generated by operation of a key on said keyboard,
   the output of said comparator being coupled to an input of said blocking circuit, and
   said comparator having signal means to cause said blocking circuit to prevent passage of signals when the desired count is reached.

2. A teleprinting apparatus in accordance with claim 1 wherein an interval counter is provided in said circuit and has means for producing a predetermined desired interval between sequences of selection pulses.

3. A teleprinting apparatus in accordance with claim 1 wherein said comparator includes a data selector and a decoder coupled to its input, means for coupling the keyboard signals to the decoder, the output of the decoder being coupled to the data selector, the output of the data selector being coupled to an input of the selection pulse counter.

4. A teleprinting apparatus in accordance with claim 1 wherein said blocking circuit is an AND gate.

5. A teleprinting apparatus in accordance with claim 1 wherein said control circuit includes a flip-flop circuit having an output coupled to a blocking input of said first-mentioned counter and to the selection pulse counter and wherein means are provided to cause said flip-flop to deliver an erasure signal to said counters after each of the sequence intervals.

6. A teleprinting apparatus in accordance with claim 1 wherein a reselection key is provided to emit a selection signal for causing the selection pulse generator to emit an additional sequence of selection pulses after the connection is made to a remote receiver.

7. In a teleprinting apparatus, a circuit arrangement for the transmission of dialing signals in response to keyboard operation comprising:
   a data input device,
   an output circuit being coupled to a data switching center,
   a transmission device coupled to the data input device,
   a conversion device in parallel with the transmission device for converting data signals into dialing signals,
   a remote control device coupled to the conversion device and to the transmission device for switching the output circuit to the conversion device during a dialing operation and at other times to said transmission device,
   a receiver, a printer and means coupling the output of the transmission device to the receiver and printer,
   means for producing a pulse train of constant frequency,
   means for producing a "proceed to select" signal, for initiating said pulse train,
   signal means generated by operation of the keyboard for determining the number of pulses from said pulse train to be used as selection pulses,
   the exact number of said pulses being determined to correspond to the number of the keys being operated, means being provided to conduct the keyboard selection signals to the printing device of said teleprinter for verification of selection accuracy, and
said means including means for maintaining a connection from said data input device through said transmission device to the receiver and printer during the keyboard dialing process.

* * * * *